United States Patent
Mitchell et al.

(10) Patent No.: US 10,690,552 B2
(45) Date of Patent: Jun. 23, 2020

(54) DTS PERFORMANCE IMPROVEMENT THROUGH VARIABLE MODE PATH LENGTH AVERAGING

(71) Applicants: Ian Mitchell, Katy, TX (US); Alexander Michael Barry, Cypress, TX (US); William Albert Johnston, Houston, TX (US)

(72) Inventors: Ian Mitchell, Katy, TX (US); Alexander Michael Barry, Cypress, TX (US); William Albert Johnston, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 302 days.

(21) Appl. No.: 15/833,054

(22) Filed: Dec. 6, 2017

(65) Prior Publication Data

US 2019/0170593 A1 Jun. 6, 2019

(51) Int. Cl.
| | |
|---|---|
| *G01K 7/00* | (2006.01) |
| *G01J 1/00* | (2006.01) |
| *G01K 13/00* | (2006.01) |
| *G01K 11/32* | (2006.01) |
| *E21B 47/06* | (2012.01) |

(52) U.S. Cl.
CPC ............ *G01K 11/32* (2013.01); *E21B 47/065* (2013.01)

(58) Field of Classification Search
USPC .................................. 374/161, 131, 100, 137
See application file for complete search history.

(56) References Cited

U.S. PATENT DOCUMENTS

| | | | | |
|---|---|---|---|---|
| 4,713,538 A | * | 12/1987 | Theocharous | G01D 5/268 250/227.23 |
| 4,767,219 A | * | 8/1988 | Bibby | G01K 11/32 250/340 |
| 8,496,376 B2 | * | 7/2013 | Lee | G01K 11/32 374/1 |
| 9,823,277 B1 | | 11/2017 | Lagakos et al. | |
| 2006/0153274 A1 | * | 7/2006 | Seebacher | G01K 11/32 374/130 |
| 2006/0210269 A1 | * | 9/2006 | Farhadiroushan | G01K 11/32 398/48 |
| 2007/0260846 A1 | * | 11/2007 | Burton | G06F 12/0862 711/216 |
| 2009/0202192 A1 | * | 8/2009 | Taverner | E21B 47/04 385/12 |
| 2011/0231135 A1 | * | 9/2011 | Suh | G01K 11/32 702/99 |

(Continued)

OTHER PUBLICATIONS

International Search Report and Written Opinion for PCT Application No. PCT/US2018/058702, dated Feb. 20, 2019, pp. 1-13.

*Primary Examiner* — Mirellys Jagan
(74) *Attorney, Agent, or Firm* — Cantor Colburn LLP

(57) ABSTRACT

A system and method to determine temperature include an optical fiber and at least two pulse laser sources to transmit light pulses with at least two wavelengths into the optical fiber. The system also includes an optical path length modulator to modulate the optical path length of the optical fiber as the light pulses are transmitted into the optical fiber. At least two photodetectors detect backscatter reflected in the optical fiber, and a processor determines the temperature based on the backscatter.

17 Claims, 4 Drawing Sheets

(56) References Cited

U.S. PATENT DOCUMENTS

| | | | |
|---|---|---|---|
| 2012/0183015 A1* | 7/2012 | Hill | G01K 11/32 374/161 |
| 2012/0274927 A1 | 11/2012 | Li et al. | |
| 2012/0307861 A1* | 12/2012 | Takei | G01K 3/06 374/102 |
| 2013/0156066 A1* | 6/2013 | Kwon, II | G01K 11/32 374/161 |
| 2014/0153611 A1* | 6/2014 | Kasajima | G01K 11/32 374/130 |
| 2015/0260588 A1* | 9/2015 | Babin | G01K 11/32 374/161 |
| 2015/0300891 A1* | 10/2015 | Mitchell | G01K 11/32 356/73.1 |
| 2016/0018272 A1* | 1/2016 | Nishio | G01K 15/005 374/1 |
| 2016/0168980 A1* | 6/2016 | Bedry | E21B 47/065 374/136 |
| 2016/0202142 A1 | 7/2016 | Wang et al. | |
| 2017/0010385 A1 | 1/2017 | Englich et al. | |
| 2017/0052049 A1* | 2/2017 | Crickmore | E21B 47/065 |
| 2017/0268987 A1 | 9/2017 | Swanson | |

\* cited by examiner

DTS PERFORMANCE IMPROVEMENT THROUGH VARIABLE MODE PATH LENGTH AVERAGING

BACKGROUND

In the drilling and completion industry, the formation of boreholes for the purpose of exploration and production efforts may include the determination of different environmental parameters (e.g., temperature, pressure) and formation-specific parameters (e.g., resistivity). Distributed temperature sensing (DTS) is an exemplary process of determining temperature in a borehole. DTS involves estimating temperature based on different wavelengths of light scattered by an optical fiber and measured by optoelectronic devices.

The art would benefit from systems and methods that address systematic nose in the fiber.

SUMMARY

An embodiment of a system to determine temperature includes an optical fiber, at least two pulse laser sources to transmit light pulses with at least two wavelengths into the optical fiber, and an optical path length modulator to modulate the optical path length of the optical fiber as the light pulses are transmitted into the optical fiber. At least two photodetectors detect backscatter reflected in the optical fiber, and a processor determines the temperature based on the backscatter.

An embodiment of a method of determining temperature includes generating pulses of light with at least two wavelengths for transmission into an optical fiber, and modulating an optical path length of the optical fiber as the pulses of light are transmitted into the optical fiber. The method also includes receiving backscatter from the optical fiber that results from reflections based on the transmission of the pulses of light into the optical fiber, and processing the backscatter to determine the temperature.

An embodiment of a method of arranging a distributed temperature sensing system to determine temperature includes disposing at least two light sources to transmit light pulses with at least two wavelengths and arranging an optical fiber to propagate the light pulses. The method also includes arranging an optical path length modulator to modulate the optical path length of the optical fiber as the light pulses are transmitted into the optical fiber, and configuring a processor to determine the temperature based on backscatter reflected in the optical fiber.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, temperature is one of the environmental parameters that may be of interest in the drilling and completion industry. Determination of temperature can be helpful not only in estimating formation properties but also in determining the suitability of tool operation. For example, drilling may be stopped when the temperature exceeds a specified value in order to ensure that tools and instruments are not damaged. As also noted above DTS is a known technique for determining temperature. Generally, DTS refers to transmitting light of one or more wavelengths into an optical fiber, detecting the scattered (i.e., reflected) light at one or more wavelengths of interest, and processing the detections to determine temperature. However, the technique suffers from a systematic noise level in the optical fiber. Specifically, a scattered wavelength of interest is used along with an estimate of loss over distance of the optical fiber. This estimate of loss is affected by the systematic noise level.

Embodiments of the systems and methods detailed herein relate to using a multimode optical fiber and an optical path length modulator to reduce the noise level in the loss estimate. Multimode optical fiber is an optical fiber with a larger core diameter than a single mode optical fiber that enables multiple light modes to be propagated. That is, light follows multiple paths within the core. By using the optical path length modulator to stretch and compress the optical fiber as light pulses are transmitted, different propagation modes are excited in the optical fiber for the different transmissions. While operation of the optical path length modulator does not affect the primary scattered wavelength of interest, it facilitates averaging down of the systematic noise to improve signal-to-noise ratio (SNR) of the secondary scattered wavelength used to estimate loss.

Figure 1:
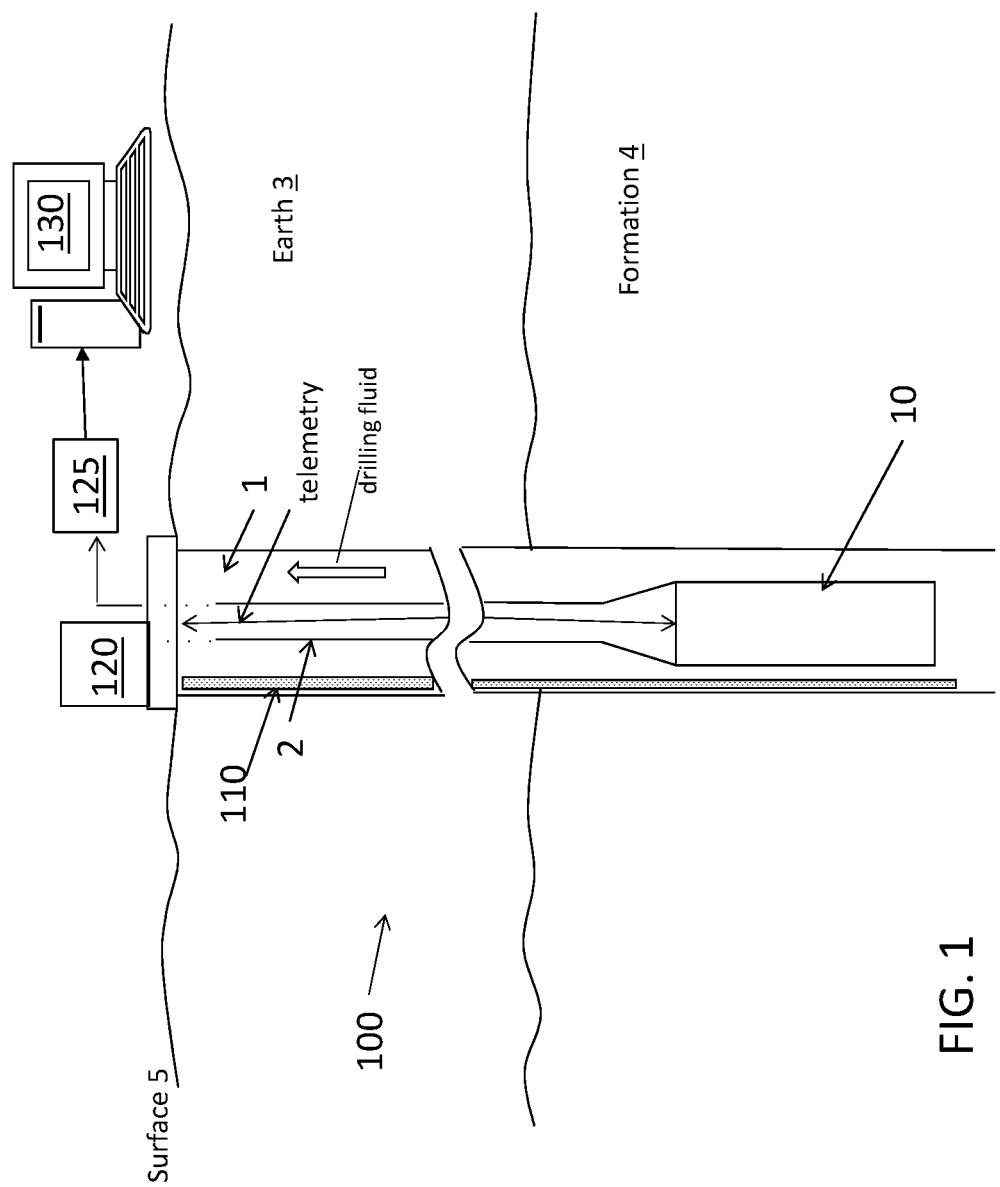
FIG. 1 is a cross-sectional view of a distributed temperature sensing (DTS) system in a borehole according to one or more embodiments.

FIG. 1 is a cross-sectional illustration of a borehole 1 and a distributed temperatures sensing (DTS) system 100 according to embodiments of the invention. The arrangement shown in FIG. 1 is one exemplary use of the DTS system 100. While the DTS system 100 may be used in other environments or in other sub-surface arrangements, the exemplary DTS system 100 shown in FIG. 1 is arranged to measure temperature in a borehole 1 penetrating the earth 3 including a formation 4. A set of tools 10 may be lowered into the borehole 1 by a string 2. In embodiments of the invention, the string 2 may be a casing string, production string, an armored wireline, a slickline, coiled tubing, or a work string. In measure-while-drilling (MWD) embodiments, the string 2 may be a drill string, and a drill would be included below the tools 10. Information from the sensors and measurement devices included in the set of tools 10 may be sent to the surface for processing by the surface processing system 130 via a fiber link or telemetry.

An analog-to-digital converter (ADC) 125 may be used to digitize data obtained by the DTS system 100 or by other sensors. The processing system 130 (e.g., computing device) includes one or more processors and one or more memory devices in addition to an input interface and an output device. In alternate embodiments, the ADC 125 and processing system 130 may be in the borehole 1 or may be distributed both in the borehole 1 and on the surface 5. In still further embodiments, the ADC 125 and processing system 130 may be part of the DTS system 100, as well. The DTS system 100 includes an optical fiber 110 that is detailed with reference to FIG. 2, and an interrogation and detection unit 120 that is detailed with reference to FIG. 3. The DTS system 100 may be used to monitor temperature in the borehole 1. In other embodiments, with a cased borehole 1 or with the DTS system 100 arranged with the optical fiber 110 along a pipeline, the DTS system 100 may be used to monitor temperature along the pipeline, which may be disposed on the surface or in a sub-sea environment.

Figure 2:
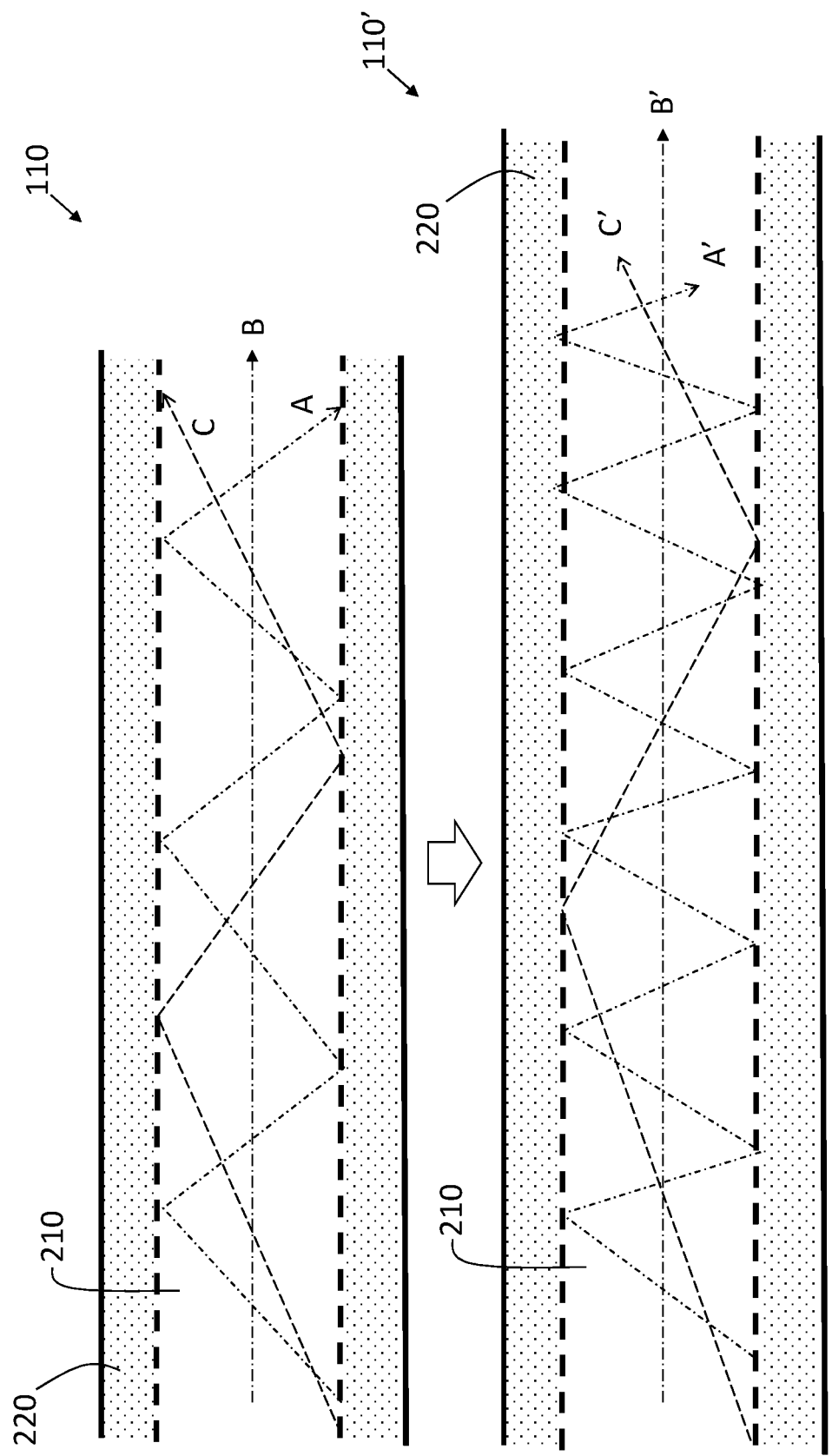
FIG. 2 depicts cross-sectional views of the optical fiber according to one or more embodiments.

FIG. 2 depicts cross-sectional views of a portion of the optical fiber 110 according to exemplary embodiments. The optical fiber 110 is a multimode optical fiber with a core 210 and cladding 220 around the core 210. As FIG. 2 indicates, light follows multiple paths A, B, C within the core 210 by bouncing at different points between the boundary of the core 210 and the cladding 220 that surrounds the core 210 or by going through the core 210. As further discussed below, the paths A, B, C change when the optical path length of the optical fiber 110 is changed. This is shown for stretched optical fiber 110'. The light follows paths A', B', and C'. Only the path B' is unchanged from the optical fiber 110 to the stretched optical fiber 110'

Figure 3:
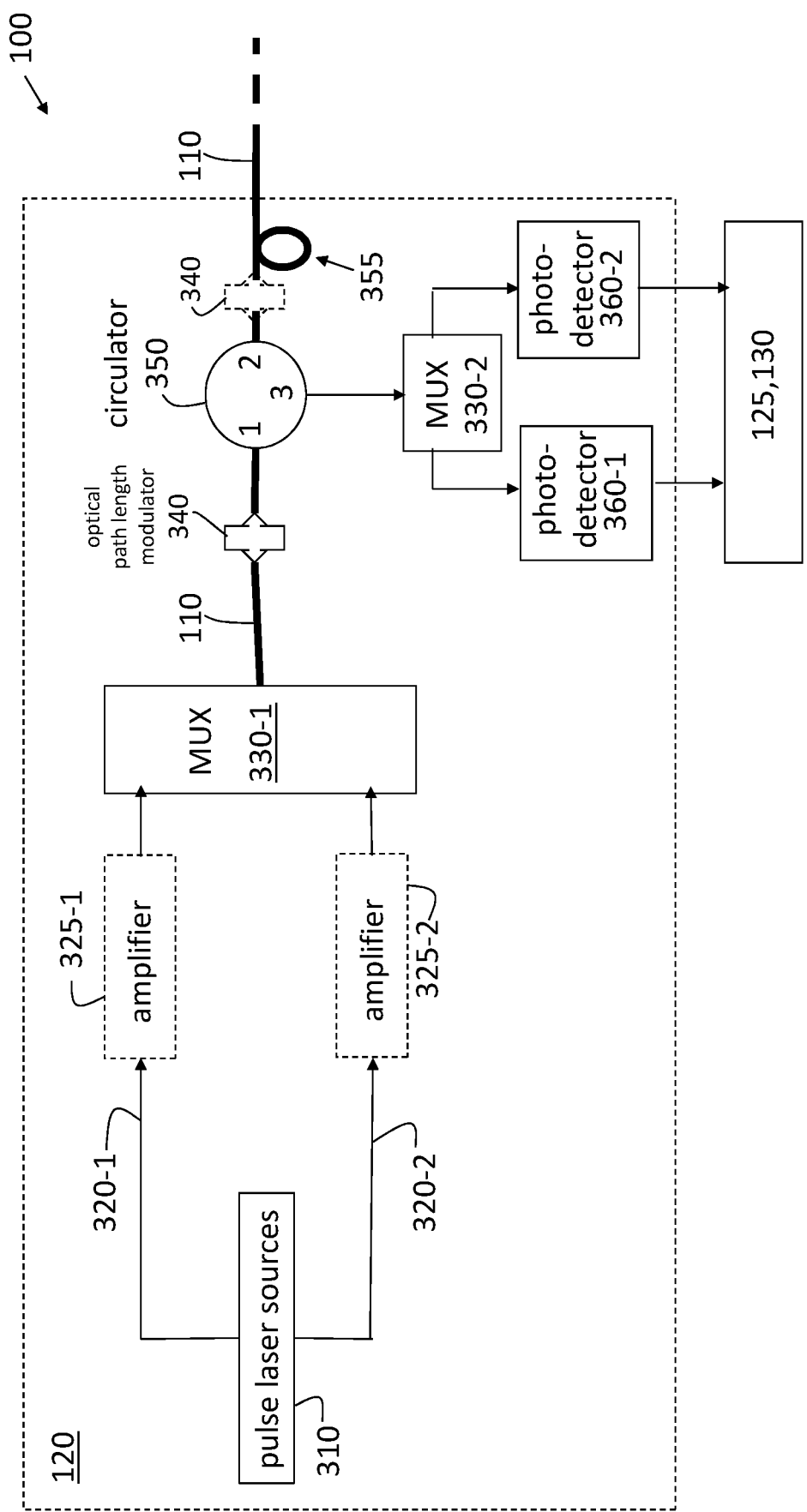
FIG. 3 is a block diagram detailing the DTS system indicated in FIG. 1.

FIG. 3 is a block diagram detailing the DTS system 100 according to one or more embodiments. The interrogation unit 120, which may be disposed at the surface 5, as shown in FIG. 1, includes pulse laser sources 310. The pulse laser sources 310 may be high voltage pulse drivers according to an exemplary embodiment. At least two pulse laser sources 310 produce light pulses at a first wavelength 320-1 and light pulses at a second wavelength 320-2. Exemplary wavelength pairs may have values on the order of 1000 nanometers (nm) to 1700 nm, and exemplary wavelength pairs include 1030 nm and 1060 nm, 1450 nm and 1550 nm, 1470 nm and 1550 nm, and 1550 nm and 1650 nm. Optionally, the interrogation and detection unit 120 may include an amplifier 325-1 for the light pulses at the first wavelength 320-1, an amplifier 325-2 for the light pulses at the second wavelength 320-2, or both. A multiplexer (MUX) 330-1 essentially acts as a pass-through according to exemplary embodiments, because the light pulses at the first wavelength 320-1 and the light pulses at the second wavelength 320-2 are generated in turn such that only one of those is provided to the MUX 330-1 at a time.

A light pulse at the first wavelength 320-1 or a light pulse at the second wavelength 320-2 is output, in turn, through the MUX 330-1 into the optical fiber 110. As previously noted, the optical fiber 110 is a multimode optical fiber. In prior temperature sensing systems, noise in the loss estimate used to determine temperature was reduced based on statistically averaging the temperature measurements obtained with multiple pulses at each of the two wavelengths. According to embodiments detailed herein, the optical path length modulator 340 improves the outcome of that statistical averaging.

Rayleigh scatter traces differ from the true loss curve of the optical fiber 110 due to a form of speckle noise called coherent Rayleigh noise. This coherent Rayleigh noise features a different pattern for each mode that is excited in a multimode optical fiber 110. By modulating the optical path length modulator 340 and obtaining different modes in the outgoing optical light pulses at the first wavelength 320-1 and light pulses at the second wavelength 320-2, a large number of Rayleigh traces can be measured which will all have different patterns of coherent Rayleigh noise. Once all of these traces are averaged together (or combined together mathematically through some other process) the Rayleigh traces become significantly smoother and more closely approximate the true loss curve of the optical fiber 110. This allows for the calculation of more accurate, lower noise temperature traces. This is further discussed with reference to FIG. 4.

The optical path length modulator 340 may be a fiber stretcher, for example, and changes the optical path length in the core 210 of the optical fiber 110 such that the paths (e.g., A, B, C in FIG. 2) taken by the light pulse are different each time the optical path length modulator 340 operates on the optical fiber 110. The operation of the optical path length modulator 340 may be in a saw tooth pattern such that the stretch in the optical fiber 110 is increased to a maximum length and then released to the original length. The operation of the optical path length modulator 340 may instead be random and is not synchronized with the generation of the light pulses by the pulse laser sources 310.

As FIG. 3 shows, the DTS system 100 also includes a circulator 350, and, in accordance with alternate embodiments, the optical path length modulator 340 may be disposed on either side of the circulator 350. The three positions 1, 2, 3 are indicated for the circulator 350. At position 1, a light pulse at the first wavelength 320-1 or a light pulse at the second wavelength 320-2, affected by the optical path length modulator 340, in input. The circulator 350 provides this input to position 2 which is a continuation of the optical fiber 110 into the borehole 1. A reference coil 355 is shown. The reference coil 355 is a portion of the optical fiber 110 that is held at a known temperature and used to normalize backscatter measurements according to a known calibration method.

When a light pulse at the first wavelength 320-1 or a light pulse at the second wavelength 320-2 travels down the optical fiber 110, the anti-Stokes Raman scatter and Rayleigh scatter are reflected back to position 2 of the circulator 350 and provided to position 3 of the circulator 350. At position 3 of the circulator 350, the backscatter is separated by another MUX 330-2 to two photodetectors 360-1, 360-2 that each detect one of the wavelengths. The outputs from the photodetectors 360-1, 360-2 are processed to determine temperature. In the exemplary embodiment shown in FIG. 3, the processing is done by the ADC 125 and processing system 130. Any reflection into the circulator 350 at position 3 is discarded. The processing to determine temperature is discussed with reference to FIG. 4.

Figure 4:
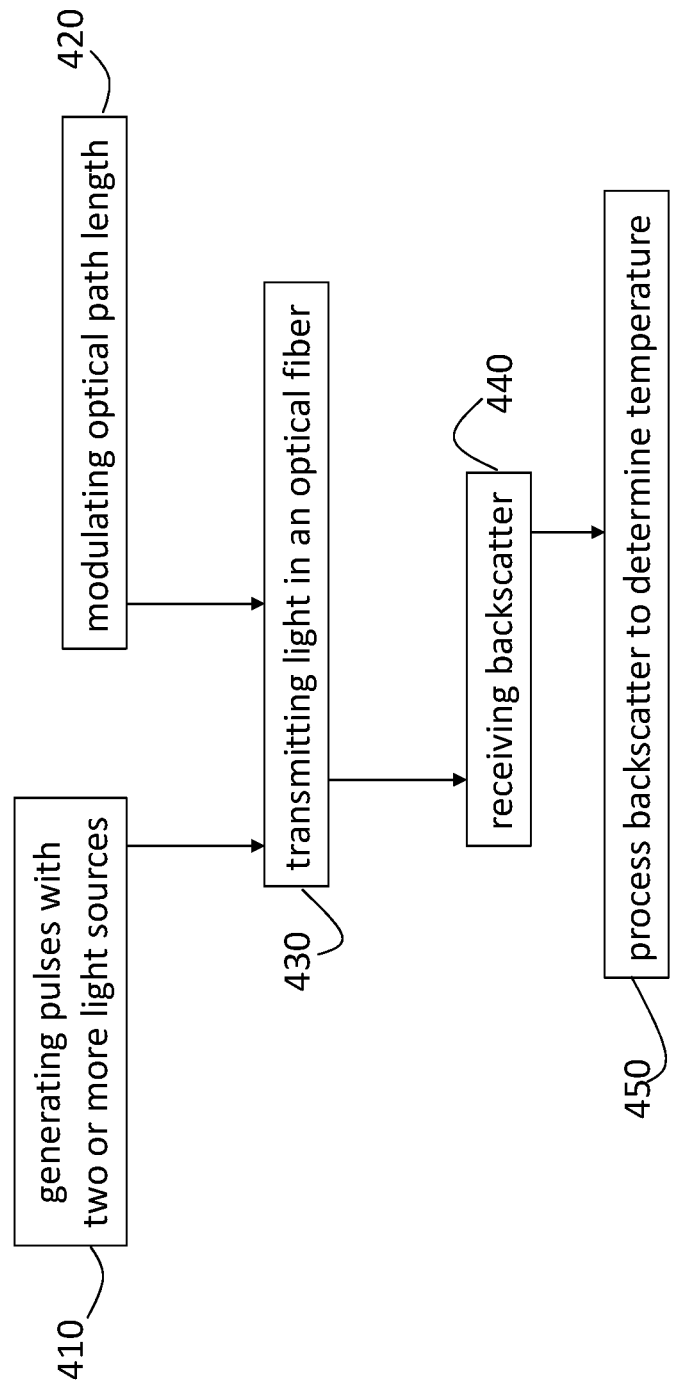
FIG. 4 is a process flow of a method of determining temperature using the DTS system according to one or more embodiments.

FIG. 4 shows a process flow of a method of determining temperature using the DTS system 100 according to one or more embodiments. At block 410, generating pulses with two or more light sources includes using the pulse laser sources 310 discussed with reference to FIG. 3, for example. The pulse laser sources 310 generate pulses at a first wavelength 320-1 and pulses at a second wavelength 320-2. Modulating the optical path length, at block 420, refers to exciting different propagation modes in the optical fiber 110 through the operation of the optical path length modulator 340. Transmitting light in the optical fiber 110 into the borehole 1, at block 430, is based on the circulator 350.

At block 440, receiving backscatter is through the circulator 350 at the photodetectors 360-1, 360-2. According to an exemplary embodiment, anti-Stokes Raman scatter and Rayleigh scatter are received as a result of one of the wavelengths (e.g., based on pulses at the first wavelength 320-1). The anti-Stokes Raman signal AS is approximated as:

$$\frac{1}{\lambda_{as}^4} F(T) \cdot \alpha(\lambda_p) \alpha(\lambda_{as}) \qquad [\text{EQ. 1}]$$

F(T) includes all the temperature-dependent terms, $\alpha(\lambda_{as})$ is the attenuation for the pulse traveling down the optical fiber 110 (into the borehole 1), and $\alpha(\lambda_{as})$ is the attenuation for the backscatter traveling up the optical fiber 110 after undergoing the (anti-Stokes) Raman scattering effect. $\lambda_{as}$ is the wavelength of the anti-Stokes Raman scatter, and $\lambda_p$ is the wavelength of the incident pulse of light (320-1, 320-2). Thus, the anti-Stokes Raman signal AS sees loss at two different wavelengths ($\lambda_p$ and $\lambda_{as}$). In order to correct loss in the optical fiber 110 for the anti-Stokes Raman signal AS, the Rayleigh backscatter must be measured at two different wavelengths.

The second Rayleigh signal RAp (e.g., resulting from pulses at the second wavelength 320-2) (e.g., resulting from pulses at the second wavelength 320-2) is given by:

$$\frac{1}{\lambda_p^4} \sigma \cdot \alpha(\lambda_p)\alpha(\lambda_p) \quad [\text{EQ. 2}]$$

$\sigma$ represents all the geometrical and fundamental constants associated with RAp. In the case of (elastic) Rayleigh scattering, there is no change in wavelength between the pulse (associated with the injected light) travelling down the optical fiber 110 and the backscatter (associated with the Rayleigh scattering) travelling up the optical fiber 110. Thus, $\alpha(\lambda_p)$ is used twice in EQ. 2. The Rayleigh signal (light intensity resulting from Rayleigh scattering) RAas in terms of the anti-Stokes Raman scatter wavelength $\lambda_{as}$ is given by:

$$\frac{1}{\lambda_{as}^4} \kappa \cdot \alpha(\lambda_{as})\alpha(\lambda_{as}) \quad [\text{EQ. 3}]$$

$\kappa$ represents all the geometrical and fundamental constants associated with RAas. As noted with reference to RAp, there is no change in wavelength between the pulse (associated with the injected light) travelling down the optical fiber 110 and the backscatter (associated with the Rayleigh scattering) travelling up the optical fiber 110. Thus, $\alpha(\lambda_{as})$ is used twice in EQ. 3.

At block 450, processing backscatter to determine temperature includes computing temperature based on the anti-Stokes Raman signal AS (according to EQ. 1), Rayleigh signal RAp (according to EQ. 2), and Rayleigh signal RAas (according to EQ. 3) as:

$$\frac{AS}{\sqrt{RAp}\sqrt{RAas}} \quad [\text{EQ. 4}]$$

Based on EQS. 1 through 3, EQ. 4 may be re-written as:

$$\frac{\frac{1}{\lambda_{as}^4} F(T)}{\sqrt{\left(\frac{1}{\lambda_p \lambda_{as}}\right)^4 \cdot \sigma\kappa}} \quad [\text{EQ. 5}]$$

The equations above are not different from those used in prior anti-Stokes Raman and Rayleigh scatter-based temperature sensing. However, by modulating the optical path length of the optical fiber 110, using the optical path length modulator 340, the temperature determination is more accurate due to reduced noise in the loss estimate that is provided by the Rayleigh scatter. Specifically, the Rayleigh signals resulting from the two different wavelengths, determined according to EQS. 2 and 3, are averaged prior to determining temperature according to EQ. 5.

Set forth below are some embodiments of the foregoing disclosure:

Embodiment 1: A system to determine temperature, comprising an optical fiber; at least two pulse laser sources configured to transmit light pulses with at least two wavelengths into the optical fiber; an optical path length modulator configured to modulate the optical path length of the optical fiber as the light pulses are transmitted into the optical fiber; at least two photodetectors configured to detect backscatter reflected in the optical fiber; and a processor configured to determine the temperature based on the backscatter.

Embodiment 2: The system of any prior embodiment, further comprising a circulator configured to direct the backscatter to the processor.

Embodiment 3: The system of any prior embodiment, further comprising a multiplexer configured to receive the backscatter from the circulator and separate the backscatter according to the at least two wavelengths.

Embodiment 4: The system of any prior embodiment, further comprising an optical amplifier configured to amplify the light pulses at one of the at least two wavelengths.

Embodiment 5: The system of any prior embodiment, wherein the processor is configured to determine the temperature according to:

$$\frac{AS}{\sqrt{RAp}\sqrt{RAas}},$$

where AS is an anti-Stokes Raman signal obtained from the backscatter, and RAp and RAas are Rayleigh signals obtained respectively using incident and backscattered wavelengths.

Embodiment 6: The system of any prior embodiment, wherein the optical fiber is a multimode optical fiber.

Embodiment 7: A method of determining temperature comprising generating pulses of light with at least two wavelengths for transmission into an optical fiber; modulating an optical path length of the optical fiber as the pulses of light are transmitted into the optical fiber; receiving backscatter from the optical fiber that results from reflections based on the transmission of the pulses of light into the optical fiber; and processing, using a processor, the backscatter to determine the temperature.

Embodiment 8: The method of any prior embodiment, further comprising directing the backscatter from the optical fiber to the processor using a circulator.

Embodiment 9: The method of any prior embodiment, further comprising separating the backscatter from the circulator to the at least two wavelengths.

Embodiment 10: The method of any prior embodiment, further comprising detecting the backscatter at the at least two wavelengths with at least two photodetectors.

Embodiment 11: The method of any prior embodiment, further comprising amplifying the light pulses at one of the at least two wavelengths using an optical amplifier.

Embodiment 12: The method of any prior embodiment, further comprising determining the temperature according to:

$$\frac{AS}{\sqrt{RAp}\sqrt{RAas}},$$

where AS is an anti-Stokes Raman signal obtained from the backscatter, and RAp and RAas are Rayleigh signals obtained respectively using incident and backscattered wavelengths.

Embodiment 13: A method of arranging a distributed temperature sensing system to determine temperature comprising disposing at least two light sources to transmit light pulses with at least two wavelengths; arranging an optical fiber to propagate the light pulses; arranging an optical path length modulator to modulate the optical path length of the optical fiber as the light pulses are transmitted into the optical fiber; and configuring a processor to determine the temperature based on backscatter reflected in the optical fiber.

Embodiment 14: The method of any prior embodiment, wherein the disposing the at least two light sources includes disposing at least two pulse laser sources.

Embodiment 15: The method of any prior embodiment, wherein the arranging the optical fiber includes arranging a multimode optical fiber to propagate the light pulses via two or more paths through the optical fiber.

Embodiment 16: The method of any prior embodiment, further comprising disposing a circulator to divert the backscatter from the optical fiber to the processor.

Embodiment 17: The method of any prior embodiment, further comprising disposing a multiplexer to receive the backscatter diverted by the circulator and separate the backscatter according to wavelength.

Embodiment 18: The method of any prior embodiment, further comprising at least two photodetectors to receive the backscatter at a respective one of the wavelengths.

Embodiment 19: The method of any prior embodiment, further comprising disposing an optical amplifier to amplify the light pulses with one of the at least two wavelengths.

Embodiment 20: The method of any prior embodiment, wherein the configuring the processor includes configuring the processor to determine the temperature according to:

$$\frac{AS}{\sqrt{RAp}\sqrt{RAas}},$$

where AS is an anti-Stokes Raman signal obtained from the backscatter, and RAp and RAas are Rayleigh signals obtained respectively using incident and backscattered wavelengths.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A system to determine temperature, the system comprising:
   an optical fiber;
   at least two pulse laser sources configured to transmit light pulses with at least two wavelengths into the optical fiber;
   an optical path length modulator configured to modulate the optical path length of the optical fiber as the light pulses are transmitted into the optical fiber;
   at least two photodetectors configured to detect backscatter reflected in the optical fiber resulting from the light pulses transmitted into the optical fiber; and
   a processor configured to determine the temperature based on the backscatter, wherein the processor is configured to determine the temperature according to:

$$\frac{AS}{\sqrt{RAp}\sqrt{RAas}},$$

where
   AS is an anti-Stokes Raman signal obtained from the backscatter, and RAp and RAas are Rayleigh signals obtained respectively using wavelengths of the light pulses and of the backscatter.

2. The system according to claim 1, further comprising an optical amplifier configured to amplify the light pulses at one of the at least two wavelengths.

3. The system according to claim 1, wherein the optical fiber is a multimode optical fiber.

4. The system according to claim 1, further comprising a circulator configured to direct the backscatter to the processor.

5. The system according to claim 4, further comprising a multiplexer configured to receive the backscatter from the circulator and separate the backscatter according to the at least two wavelengths.

6. A method of determining temperature, the method comprising:
   generating pulses of light with at least two wavelengths for transmission into an optical fiber;
   modulating an optical path length of the optical fiber as the pulses of light are transmitted into the optical fiber;
   receiving backscatter from the optical fiber that results from reflections based on the transmission of the pulses of light into the optical fiber;
   processing, using a processor, the backscatter to determine the temperature; and
   determining the temperature according to:

$$\frac{AS}{\sqrt{RAp}\,\sqrt{RAas}},$$

where
   AS is an anti-Stokes Raman signal obtained from the backscatter, and RAp and RAas are Rayleigh signals obtained respectively using wavelengths of the pulses of light and of the backscatter incident and backscattered wavelengths.

7. The method according to claim 6, further comprising amplifying the light pulses at one of the at least two wavelengths using an optical amplifier.

8. The method according to claim 6, further comprising directing the backscatter from the optical fiber to the processor using a circulator.

9. The method according to claim 8, further comprising separating the backscatter from the circulator to the at least two wavelengths.

10. The method according to claim 9, further comprising detecting the backscatter at the at least two wavelengths with at least two photodetectors.

11. A method of arranging a distributed temperature sensing system to determine temperature, the method comprising:
   disposing at least two light sources to transmit light pulses with at least two wavelengths;
   arranging an optical fiber to propagate the light pulses;
   arranging an optical path length modulator to modulate the optical path length of the optical fiber as the light pulses are transmitted into the optical fiber; and
   configuring a processor to determine the temperature based on backscatter reflected in the optical fiber resulting from the light pulses transmitted into the optical fiber, wherein the configuring the processor includes configuring the processor to determine the temperature according to:

$$\frac{AS}{\sqrt{RAp}\,\sqrt{RAas}},$$

where
   AS is an anti-Stokes Raman signal obtained from the backscatter, and RAp and RAas are Rayleigh signals obtained respectively using the at least two wavelengths of the light pulses and a wavelength of the backscatter.

12. The method according to claim 11, wherein the disposing the at least two light sources includes disposing at least two pulse laser sources.

13. The method according to claim 11, wherein the arranging the optical fiber includes arranging a multimode optical fiber to propagate the light pulses via two or more paths through the optical fiber.

14. The method according to claim 11, further comprising disposing an optical amplifier to amplify the light pulses with one of the at least two wavelengths.

15. The method according to claim 11, further comprising disposing a circulator to divert the backscatter from the optical fiber to the processor.

16. The method according to claim 15, further comprising disposing a multiplexer to receive the backscatter diverted by the circulator and separate the backscatter according to the at least two wavelengths.

17. The method according to claim 16, further comprising at least two photodetectors to receive the backscatter from the multiplexer at a respective one of the at least two wavelengths.

* * * * *